United States Patent
Huang

(10) Patent No.: US 12,089,179 B2
(45) Date of Patent: Sep. 10, 2024

(54) NETWORK CONNECTION METHOD AND RELATED PRODUCT

(71) Applicant: GUANGDONG OPPO MOBILE TELECOMMUNICATIONS CORP., LTD., Guangdong (CN)

(72) Inventor: Yuan Huang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 619 days.

(21) Appl. No.: 17/374,957

(22) Filed: Jul. 13, 2021

(65) Prior Publication Data

US 2021/0345290 A1    Nov. 4, 2021

Related U.S. Application Data

(63) Continuation of application No. PCT/CN2020/071191, filed on Jan. 9, 2020.

(30) Foreign Application Priority Data

Jan. 14, 2019    (CN) .......................... 201910035070.3

(51) Int. Cl.
*H04W 64/00* (2009.01)
*H04W 4/02* (2018.01)
(Continued)

(52) U.S. Cl.
CPC ......... *H04W 64/006* (2013.01); *H04W 4/025* (2013.01); *H04W 16/22* (2013.01);
(Continued)

(58) Field of Classification Search
None
See application file for complete search history.

(56) References Cited

U.S. PATENT DOCUMENTS

| | | | |
|---|---|---|---|
| 9,907,007 B1 * | 2/2018 | Xue ..................... | H04W 36/30 |
| 2005/0206564 A1 * | 9/2005 | Mao ..................... | H01Q 3/2682 |
| | | | 342/377 |

(Continued)

FOREIGN PATENT DOCUMENTS

| | | | | |
|---|---|---|---|---|
| CN | 1852568 A | | 10/2006 | |
| CN | 101442786 A | * | 5/2009 | ............ H04W 48/20 |

(Continued)

OTHER PUBLICATIONS

Extended European Search Report for EP Application 20741073.9 mailed Mar. 2, 2022. (12 pages).

(Continued)

*Primary Examiner* — Liem H. Nguyen
(74) *Attorney, Agent, or Firm* — Young Basile Hanlon & MacFarlane, P.C.

(57) ABSTRACT

A method for connecting to a network and a related product are provided. The method includes: determining a motion section and a motion rate of an electronic device in response to the electronic device accessing to a mobile data network; estimating a target network rate of the mobile data network based on the motion rate and the motion section; and connecting to a target wireless network when the target network rate is less than a preset threshold.

18 Claims, 4 Drawing Sheets

(51) Int. Cl.
*H04W 16/22* (2009.01)
*H04W 24/02* (2009.01)
*H04W 24/10* (2009.01)
*H04W 28/02* (2009.01)
*H04W 28/08* (2023.01)
*H04W 48/18* (2009.01)

(52) U.S. Cl.
CPC ........... *H04W 24/02* (2013.01); *H04W 24/10* (2013.01); *H04W 28/0268* (2013.01); *H04W 28/095* (2020.05); *H04W 48/18* (2013.01)

(56) References Cited

U.S. PATENT DOCUMENTS

| | | | |
|---|---|---|---|
| 2009/0012360 A1* | 1/2009 | Kimoto | A61B 1/00016 600/118 |
| 2011/0096753 A1* | 4/2011 | Abdel-Kader | H04B 17/318 370/332 |
| 2014/0302852 A1 | 10/2014 | Ostergaard et al. | |
| 2015/0106312 A1* | 4/2015 | Chen | H04W 4/029 706/21 |
| 2016/0112927 A1* | 4/2016 | Cui | H04W 48/20 370/332 |
| 2016/0174241 A1* | 6/2016 | Ansari | H01Q 1/32 370/329 |
| 2016/0234726 A1 | 8/2016 | Nuggehalli et al. | |
| 2017/0201973 A1 | 7/2017 | Yang et al. | |
| 2020/0128467 A1* | 4/2020 | Gao | H04W 36/305 |
| 2021/0211946 A1* | 7/2021 | Li | H04W 36/00835 |
| 2022/0046475 A1* | 2/2022 | Antonioli | H04W 28/12 |
| 2022/0217556 A1* | 7/2022 | Rydén | H04W 36/008375 |

FOREIGN PATENT DOCUMENTS

| | | | | |
|---|---|---|---|---|
| CN | 101980569 A | | 2/2011 | |
| CN | 102547833 A | | 7/2012 | |
| CN | 103188734 A | | 7/2013 | |
| CN | 103731860 A | | 4/2014 | |
| CN | 105227892 A | | 1/2016 | |
| CN | 106487899 A | | 3/2017 | |
| CN | 107484190 A | | 12/2017 | |
| CN | 104267890 B | * | 6/2018 | ......... G06F 3/04847 |
| CN | 108702670 A | | 10/2018 | |
| WO | 2016186697 A1 | | 11/2016 | |

OTHER PUBLICATIONS

International Search Report with English Translation for International Application PCT/CN2020/071191 mailed Mar. 25, 2020. (22 pages).

Chinese Office Action with English Translation for CN Application 201910035070.3 mailed Feb. 3, 2020. (12 pages).

Chinese Notice of Allowance with English Translation for CN Application 201910035070.3 mailed May 21, 2020. (8 pages).

* cited by examiner

NETWORK CONNECTION METHOD AND RELATED PRODUCT

CROSS-REFERENCE TO RELATED APPLICATION(S)

This application is a continuation of International Application No. PCT/CN2020/071191 filed on Jan. 9, 2020, which claims priority to Chinese Application No. 201910035070.3 filed on Jan. 14, 2019, the entire contents of both of which are incorporated herein by reference.

TECHNICAL FIELD

The present disclosure relates to a field of electronic device technology, and specifically to a method for network connection and a related product.

BACKGROUND

With the rapid popularization of electronic devices (such as a mobile phone, a tablet computer, etc.), people may obtain various information by accessing a network with an electronic device. It is a technical problem to be solved by those skilled in the art to improve network quality.

SUMMARY

In a first aspect, embodiments of the present disclosure provide a method for connecting to a network. The method includes: determining a motion section and a motion rate of an electronic device in response to the electronic device accessing to a mobile data network; estimating a target network rate of the mobile data network based on the motion rate and the motion section; connecting to a target wireless network in response to the target network rate being less than a preset threshold.

In a second aspect, embodiments of the present disclosure provide an electronic device. The electronic device includes a processor, a memory, a communication interface, and one or more programs, in which the one or more programs are stored in the memory and configured to be executed by the processor, and the one or more programs include instructions for executing some or all of steps as described in the first aspect.

In a third aspect, embodiments of the present disclosure provide a non-transitory computer-readable storage medium, in which the computer-readable storage medium stores a computer program, and the computer program enables a computer to execute some or all of steps as described in the first aspect of the embodiments of the present disclosure.

BRIEF DESCRIPTION OF DRAWINGS

In order to explain the technical solutions in embodiments of the present disclosure more clearly, the drawings described in the embodiments will be briefly introduced below. Obviously, the drawings described as below are only some embodiments of the present disclosure. Those skilled in the art may obtain other drawings from these drawings without creative work.

DETAILED DESCRIPTION

In order to make those skilled in the art better understand the technical solutions of the present disclosure, the technical solutions of the embodiments of the present disclosure are clearly and completely described below with reference to the accompanying drawings in the embodiments of the present disclosure. Obviously, the described embodiments are merely part of rather than all of the embodiments of the present disclosure. All other embodiments obtained by persons of ordinary skill in the art based on the embodiments of the present disclosure without making creative efforts shall fall within the protection scope of the present disclosure.

In this document, terms, such as "first" and "second" and the like, may be used solely to distinguish one entity or element from another entity or element without necessarily requiring or implying any order between such entities or elements. The terms "comprises," "comprising," or any other variation thereof are intended to cover a non-exclusive inclusion, such that a process, method, system, article, or apparatus that comprises a list of steps or elements does not include only those steps or elements, but may include other steps or elements not expressly listed or inherent to such process, method, article, or apparatus.

Reference herein to "an embodiment" means that a particular feature, structure, or characteristic described in connection with the embodiment may be included in at least one embodiment of the present disclosure. The appearances of the phrase in various places of the specification are not necessarily all referring to the same embodiment, nor are separate or alternative embodiments mutually exclusive of other embodiments. Those skilled in the art will understand explicitly and implicitly that the embodiments described herein may be combined with other embodiments.

The electronic devices in the embodiments of the present disclosure may include all kinds of handheld devices, vehicle-mounted devices, wearable devices, computing devices with the wireless communication function or other processing devices connected to wireless modems, as well as various forms of user equipment (UEs), mobile stations (MSs), terminal devices, and so on. For convenience of description, the devices mentioned above are collectively referred to as electronic device. The embodiments of the present disclosure are introduced in detail below.

Figure 1:
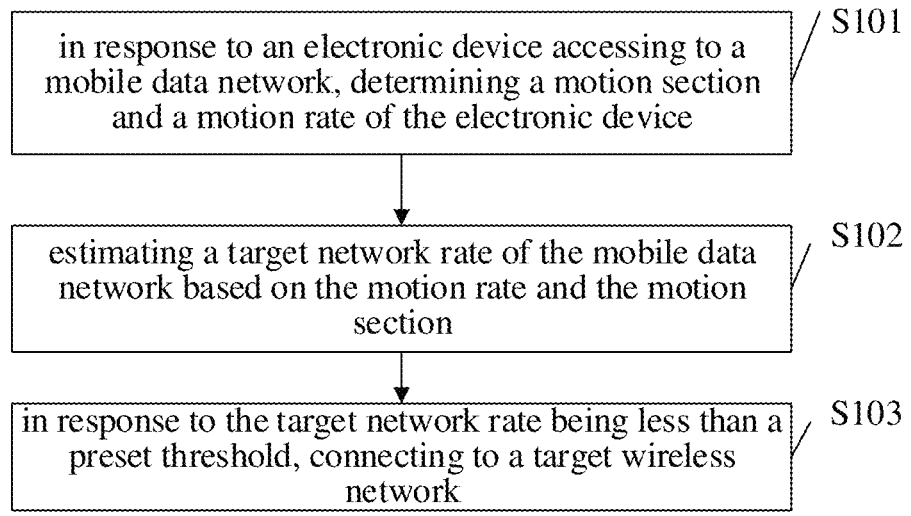
FIG. 1 is a flowchart illustrating a method for connecting to a network according to an embodiment of the present disclosure.

Referring to FIG. 1, a flowchart of a method for connecting to a network according to an embodiment of the present disclosure is provided. The method is applicable to an electronic device, and the electronic device may adopt a link aggregation technology. The link aggregation means that a device may simultaneously use two or more network ports to simultaneously access to the network, for example, a mobile phone may access to the network by using a wirelessfidelity (Wi-Fi) network and a mobile data network simultaneously through link aggregation. The Wi-Fi network is also referred to as a wireless network.

With regard to the networks connected to the electronic device, no limitation is made in the present disclosure. As illustrated in the network architecture of FIG. 2, the electronic device 200 may be connected to a mobile data network provided by a first base station 202. The mobile data network may provide networks in different frequency bands, for example, a 2-Generation wireless telephone technology (2G) network, a 3rd-Generation mobile communication technology (3G) network, a 4th-Generation mobile communication technology (4G) network and a 5th-Generation mobile communication technology (5G) network. The electronic device 200 may also be connected to wireless networks provided by different devices, such as a first hotspot device 204, a first router 206. The electronic device 200 may also be connected to networks in different frequency bands provided by the same device, for example, a 2.4 GHz wireless network and a 5 GHz wireless network provided by the first router 206.

For security of the wireless network, an identity verification process is set. When the electronic device accesses to the wireless network, the wireless network needs to verify identity information of the electronic device. A network connection is established with the electronic device upon a successful verification. For example, assuming that the wireless network is designated as "sanhuan" and a verification password is "65498231", the wireless network establishes a connection with an electronic device only when the electronic device submits "65498231".

In detail, as illustrated in FIG. 1, the method may include the following.

At block S101, in response to an electronic device accessing to a mobile data network, a motion section and a motion rate of the electronic device are determined.

In the present disclosure, the motion section refers to a route along which the electronic device may be moved, such as a partial section in a navigation line, or a frequently visited section, etc. The method for determining the motion section is not limited in the present disclosure. In one possible example, the method further includes: determining a current position and a current time of the electronic device; determining a plurality of historical movement tracks corresponding to the current position and the current time; and determining the motion section of the electronic device based on the plurality of historical movement tracks.

In the present disclosure, the current time may be determined according to a time manager of the electronic device. The current location may be determined by a positioning module of the electronic device. The positioning module may be a global positioning system (GPS) module or a wireless local area network (WLAN) module. The electronic device may further determine the current location of the electronic device from a location of a connected network device, based on a distance between the electronic device and the network device or a network speed of the electronic device searching for the network device. Since the network speed may reflect the distance between the electronic device and the network device to a certain extent, the current position of the electronic device is determined based on the fixed position of the network device and the distance between the network device and the electronic device.

The GPS module utilizes a GPS positioning satellite to perform positioning and navigation in real time in a global scope. The WLAN module utilizes a radio frequency technology and electromagnetic waves to implement a communication connection in the air. The positioning method may depend on the accessed hotspot device, such as a wireless router or an electronic device enabling a hotspot, etc.

In the present disclosure, the historical movement track is a historical motion section corresponding to the current time and the current position. For example, for the work time, the historical movement track may be an activity area in an office; for the time of leaving work and going home, the historical movement track may be a route from a company address to a home address; for the holiday time, the historical movement track may be an activity area at home or a frequently visited shopping center, etc.

It may be understood that the current position and the current time of the electronic device are determined, and the plurality of corresponding historical movement tracks are determined based on the current position and the current time. The motion section of the electronic device is determined according to the plurality of historical movement tracks. The motion section that may take place in a current state is determined according to the historical movement tracks of the electronic device, which may facilitate improving an accuracy of determining the motion section.

The method for detecting the motion rate of the electronic device is not limited in the present disclosure, for example, the detection may be performed based on a three-axis acceleration sensor in the electronic device. The three-axis acceleration sensor, characterized by small volume and light weight, may measure a steric acceleration and may be configured to measure a posture and an inclination angle of the electronic device. In addition to automatically switching between a horizontal view angle and a vertical view angle, when the global positioning system (GPS) has a poor signal performance, the three-axis acceleration sensor may be used for motion offset compensation calculation, which may reflect a motion property of an object.

Figure 3:
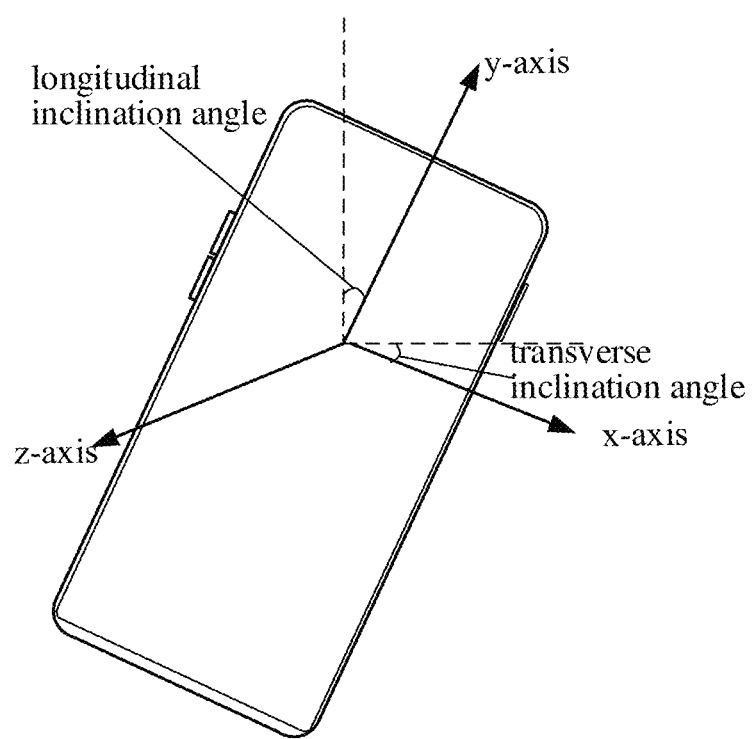
FIG. 3 is a schematic diagram illustrating a principle of a three-axis acceleration sensor according to an embodiment of the present disclosure.

Referring to FIG. 3, FIG. 3 is a schematic diagram illustrating a principle of a three-axis acceleration sensor according to an embodiment of the present disclosure. As illustrated in FIG. 3, x-axis, y-axis and z-axis are set relative to a position of the body of the electronic device. Generally, the y-axis points upwards from the body, the x-axis points rightwards from the body, and the z-axis is vertical to the front of the body. A transverse component, a longitudinal component and a vertical component are generally projections of one unit of gravity (in size of 1 g (m*m/s), vertically downward) on respective axes. A transverse inclination angle is an included angle between the x-axis and the horizontal plane, a longitudinal inclination angle is an included angle between the y-axis and the vertical plane, and a usage posture of the electronic device is determined from the transverse inclination angle, the longitudinal inclination angle and the vertical component.

For example, when the electronic device is laid on the desktop, the x-axis value is set to 0, the y-axis value is set to 0, and the z-axis value is set to 9.81 by default; when the electronic device is placed on the desktop with the front facing downwards, the z-axis value is set to −9.81; when the electronic device is inclined to left, the x-axis value is a positive value; when the electronic device is inclined to right, the x-axis value is a negative value; when the electronic device is inclined upwards, the y-axis value is a negative value; when the electronic device is inclined downwards, the y-axis value is a positive value. In case that the z-axis value is lower than −3, it may indicate that the electronic device has its display screen facing downwards.

It may be understood that, based on the three-axis acceleration sensor, the posture and the inclination angle of the electronic device are detected, and the motion rate of the electronic device is determined according to a change in the posture and inclination angle, such that the motion rate may be determined by using an internal sensor of the electronic device, thus improving a real-time performance and an accuracy of determining the motion rate.

In an implementation, a motion distance within a specified duration is obtained, and the motion rate of the electronic device is determined based on the motion distance and the specified duration.

The motion distance may be obtained through the positioning module or a ranging module, or may be obtained by capturing a target image or a target video based on a camera and determining a distance between the electronic device and a fixed position in the target image according to the target image; or may be obtained by establishing a Neighborhood Aware Network (NAN) with an adjacent device, which is not limited here.

The ranging module may be an ultrasonic ranging sensor, a laser ranging sensor, an infrared distance measuring sensor or a radar sensor, which directly determines a motion distance between the adjacent device and the electronic device according to a ranging principle, which is not limited here.

The NAN, also referred to as a Wi-Fi Alliance, is mainly configured to achieve a real-time efficient discovery mechanism, i.e., continuously discovering devices and services within a Wi-Fi range. It is a fast aware networking mode, since the NAN may be established without necessarily connecting the device to a mobile broadband network or a Wi-Fi infrastructure network, such that the Wi-Fi function may be extended and an application experience under the present circumstances may be improved.

The specified duration is a relatively short duration, such as 1 min, 5 min, etc.

It could be understood that, the motion distance of the electronic device within the specified duration is determined, and the motion rate is calculated according to the motion distance and the specified duration, so that a real-time performance and an accuracy of determining the motion rate may be improved.

At block S102, a target network rate of the mobile data network is estimated based on the motion rate and the motion section.

The method for estimating the target network rate is not limited in the present disclosure. In a possible example, estimating the target network rate of the mobile data network based on the motion rate and the motion section includes: obtaining a plurality of historical usage records of the mobile data network in the motion section; estimating a reference network rate of the mobile data network based on the plurality of historical usage records; estimating a network signal influence value based on the motion rate; and determining a product of the reference network rate and the network signal influence value as the target network rate of the mobile data network.

The plurality of historical usage records may be records that the mobile data network is used in the motion section, which may include at least one of the following: a use duration, a network rate, a number of used networks, a network dropping rate, etc.

It may be understood that the plurality of historical usage records of the electronic device using the mobile data network in the motion section are obtained, and the reference network rate of the electronic device using the mobile data network is estimated according to the plurality of historical usage records. In this way, an accuracy of estimating the reference network rate may be improved. The network signal influence value is estimated according to the motion rate of the electronic device, and the target network rate of the mobile data network is determined according to the product of the reference network rate and the network signal influence value. Since the motion rate may influence a network signal, for example, in a high-speed train, it is difficult to maintain the signal stable, the influence of the motion rate on the network signal is considered in the present disclosure, which may improve an accuracy of estimating the target network rate.

The method of estimating the reference network rate is not limited in the present disclosure. In a possible example, estimating the reference network rate of the mobile data network based on the plurality of historical usage records includes: obtaining a performance parameter of each antenna in a plurality of antennas of the electronic device, to obtain a plurality of performance parameters; estimating a network quality value of each antenna based on the plurality of performance parameters to obtain a plurality of first network quality values; counting a usage count of each antenna based on the plurality of historical usage records to obtain a plurality of usage counts; determining a weight of each antenna based on the plurality of usage counts to obtain a plurality of weights; and estimating the reference network rate of the mobile data network based on the plurality of first network quality values and the plurality of weights.

The performance parameter may include at least one of the following network dimension information: a network dropping rate, a network rate, a received signal strength, a transmission power, which is not limited here.

The first network quality value is configured to describe a network quality of each antenna in the motion section, and can be obtained by weighting an evaluation value of each piece of network dimension information based on a pre-stored weight of the network dimension information. The evaluation value corresponding to each piece of network dimension information may be calculated based on data corresponding to the network dimension information and a current performance parameter of the electronic device. For example, when the network dropping rate of the electronic device in the motion section is 20%, and the network dropping rate detected at this moment is 30%, the evaluation value corresponding to the network dropping rate is determined to be 0.5. In this way, the evaluation value of each piece of network dimension information and the weight of the network dimension information are considered, such that an accuracy of determining the first network quality value may be improved.

It may be understood that, the performance parameter of each antenna in the plurality of antennas of the electronic device is acquired to obtain the plurality of performance parameters, the network quality value of each antenna is estimated based on the plurality of performance parameters to obtain the plurality of first network quality values, and the usage count of each antenna is counted based on the plurality of historical usage records. The weight of each antenna is determined based on the usage count of the antenna to obtain the plurality of weights, and the reference network rate is estimated based on the plurality of first network quality values and the plurality of weights. In this way, the reference network rate is estimated on the basis of the performance parameters and of the usage counts of the plurality of antennas in the section, such that an accuracy of estimating the reference network rate may be improved.

At block S103, in response to the target network rate being less than a preset threshold, a target wireless network is connected.

In the present disclosure, the preset threshold is not limited and may be determined according to a minimum network speed currently required by the electronic device.

It may be understood that, in the method for connecting to a network as illustrated in FIG. 1, if the electronic device has accessed to the mobile data network, the motion section and the motion rate of the electronic device are determined, and the target network rate of the mobile data network is estimated according to the motion rate and the motion section, and if the target network rate is less than the preset threshold, the electronic device is connected to the target wireless network. In this way, the electronic device is supported to implement the network access based on the target wireless network, such that the network quality of the electronic device in the motion section may be improved.

In a possible example, before the electronic device is connected to the target wireless network, the method further includes: determining a plurality of reference wireless networks scheduled for connecting to the electronic device; determining a network quality value of each reference wireless network in the plurality of reference wireless networks to obtain a plurality of second network quality values; and determining a reference wireless network corresponding to a maximum value in the plurality of second network quality values as the target wireless network.

The reference wireless network is a secure network that has been verified successfully or needs no verification in the motion section.

The second network quality value is configured to describe a network quality of each reference network in the motion section, which may be determined according to a record of connection between the electronic device and the reference network, for example, by weighting connection parameters in different dimensions that include, for example, a connection duration, a connection count, a used network, a connection security and a network disconnection count in the connection record.

It can be appreciated that, the plurality of reference wireless networks scheduled for connecting to the electronic device are determined, the network quality value of each reference wireless network is determined to obtain the plurality of second network quality values, and the reference wireless network corresponding to the maximum value of the plurality of second network quality values is configured as the target wireless network, so that an effectiveness of the target wireless network supporting electronic device to use the network data may be improved.

In a possible example, after the electronic device is connected to the target wireless network, the method further includes: obtaining a wireless network rate of the target wireless network; in response to the wireless network rate being less than the preset threshold, determining a network data allocation ratio of the mobile data network to target wireless network based on a ratio between the target network rate and the wireless network rate; and using the mobile data network and the target wireless network based on the network data allocation ratio.

Regarding the method for obtaining the wireless network rate, reference may be made to the method for the mobile data network. If a position of a network device corresponding to the target wireless network is fixed, the wireless network rate is determined according to a performance parameter of the network device. Otherwise, an influence value of the motion rate of the network device on the network rate needs to be considered.

It may be understood that, the wireless network rate of the target wireless network is obtained, the network data allocation ratio of the mobile data network to the target wireless network is determined according to the ratio between the target network rate and the wireless network rate, and the electronic device is controlled to use the mobile data network and the target wireless network according to the network data allocation ratio. In this way, the electronic device may be supported by both the mobile data network and the target wireless network simultaneously to operate the network data, such that an effectiveness of using network may be enhanced.

In a possible example, using the mobile data network and the target wireless network based on the network data allocation ratio when the electronic device plays a multimedia file includes: estimating a motion duration for the motion section; determining a memory size of the multimedia file based on the motion duration; determining a first pre-stored data packet corresponding to the mobile data network and a second pre-stored data packet corresponding to the target wireless network respectively based on the memory size and the network data allocation ratio; controlling the mobile data network to download the first pre-stored data packet, and controlling the target wireless network to download the second pre-stored data packet.

The motion duration is a time length during which the electronic device passes through the motion section, and may be estimated according to the motion rate of the electronic device and a route length of the motion section.

The memory size is a storage space temporarily for a file segment corresponding to the motion duration.

It may be understood that the motion duration required by the electronic device to pass through the motion section is estimated, and the memory size of the multimedia file corresponding to the motion duration is determined. The first pre-stored data packet corresponding to the mobile data network and the second pre-stored data packet corresponding to the target wireless network are determined respectively according to the memory size and the network data allocation ratio, the mobile data network is controlled to download the first pre-stored data packet, and the target wireless network is controlled to download the second pre-stored data packet. In this way, file segments of multimedia files to be played by the user may be pre-cached through both the mobile data network and the target wireless network simultaneously, such that the network quality of the electronic device playing the multimedia files in the motion section may be improved.

In a possible example, the method further includes: in response to the wireless network rate being greater than or equal to the preset threshold, controlling the target wireless network to download a data packet corresponding to the memory size.

It is understood that, when the wireless network rate of the target wireless network is greater than or equal to the preset threshold, the target wireless network may be directly controlled to download a data packet of the multimedia file corresponding to the motion section, so as to improve the network quality of the electronic device playing the multimedia file in the motion section.

Figure 4:
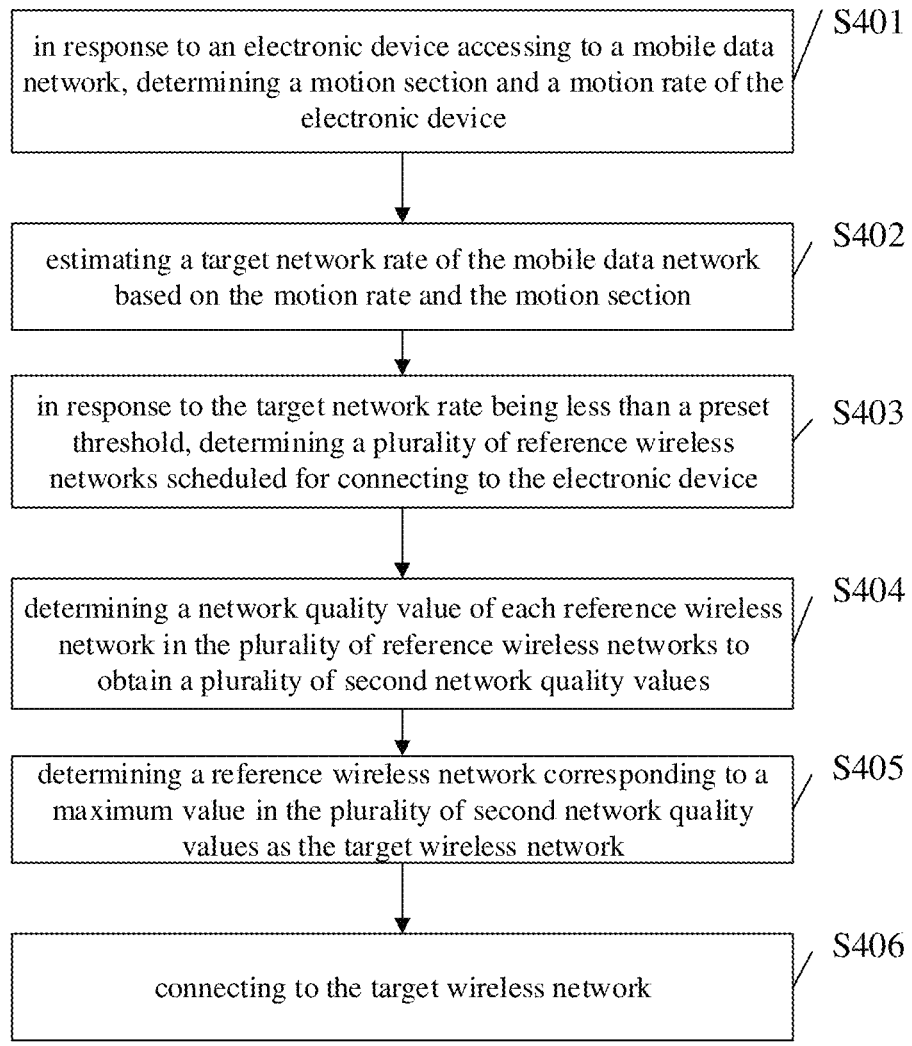
FIG. 4 is a flowchart illustrating a method for connecting to a network according to another embodiment of the present disclosure.

Referring to FIG. 4, consistent with the embodiment illustrated in FIG. 1, FIG. 4 is a flowchart illustrating a method for connecting to a network according to another embodiment of the present disclosure, as illustrated in FIG. 4.

At block S401, in response to an electronic device accessing to a mobile data network, a motion section and a motion rate of the electronic device are determined.

At block S402, a target network rate of the mobile data network is estimated based on the motion rate and the motion section.

At block S403, in response to the target network rate being less than a preset threshold, a plurality of reference wireless networks scheduled for connecting to the electronic device are determined.

At block S404, a network quality value of each reference wireless network in the plurality of reference wireless networks is determined to obtain a plurality of second network quality values.

At block S405, a reference wireless network corresponding to a maximum value in the plurality of second network quality values is determined as a target wireless network.

At block S406, the target wireless network is connected.

It can be appreciated that, if the electronic device has accessed to the mobile data network, the motion section and the motion rate of the electronic device are determined, and the target network rate of the mobile data network is estimated according to the motion rate and the motion section, and if the target network rate is less than the preset threshold, the plurality of reference wireless networks scheduled for connecting to the electronic device are determined, the network quality value of each reference wireless network is determined to obtain the plurality of second network quality values, and the reference wireless network corresponding to the maximum value in the plurality of second network quality values is configured as the target wireless network, and the electronic device is connected to the target wireless network, so that the electronic device is supported to implement the network access based on the target wireless network, thus improving the network quality of the electronic device in the motion section.

Figure 5:
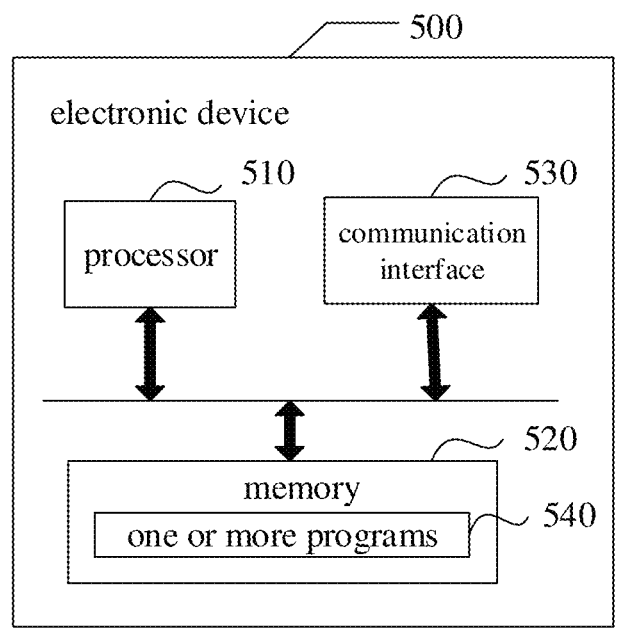
FIG. 5 is a block diagram illustrating an electronic device according to an embodiment of the present disclosure.

Referring to FIG. 5, consistent with the embodiment illustrated in FIG. 1, FIG. 5 is a block diagram illustrating an electronic device according to an embodiment of the present disclosure. As illustrated in FIG. 5, the electronic device 500 includes a processor 510, a memory 520, a communication interface 530 and one or more programs 540, in which the one or more programs 540 are stored in the memory 520 and configured to be executed by the processor 510. The one or more programs 540 include instructions configured to execute the following: in response to the electronic device 500 accessing to a mobile data network, determining a motion section and a motion rate of the electronic device 500; estimating a target network rate of the mobile data network based on the motion rate and the motion section; in response to the target network rate being less than a preset threshold, connecting to a target wireless network.

It may be understood that, by supporting the electronic device 500 to implement the network access based on the target wireless network, the network quality of the electronic device 500 in the motion section may be improved.

In a possible example, in term of estimating the target network speed of the mobile data network based on the motion rate and the motion section, the instructions in the one or more programs 540 are configured to execute the following: obtaining a plurality of historical usage records of the mobile data network in the mobile section; estimating a reference network rate of the mobile data network based on the plurality of historical usage records; estimating a network signal influence value based on the motion rate; determining a product of the reference network rate and the network signal influence value as the target network rate of the mobile data network.

In a possible example, in term of estimating the reference network rate of the mobile data network based on the plurality of historical usage records, the instructions in the one or more programs 540 are configured to execute the following: determining a performance parameter of each antenna in a plurality of antennas of the electronic device 500 to obtain a plurality of performance parameters; estimating a network quality value of each antenna in the plurality of antennas based on the plurality of performance parameters to obtain a plurality of first network quality values; counting a usage count of each antenna in the plurality of antennas based on the plurality of historical usage records to obtain a plurality of usage counts; determining a weight of each antenna in the plurality of antennas based on the plurality of usage counts to obtain a plurality of weights; estimating the reference network rate of the mobile data network based on the plurality of first network quality values and the plurality of weights.

In a possible example, in term of determining the mobile section of the electronic device 500, the instructions in the one or more programs 540 are configured to execute the following: determining a current position and a current time of the electronic device 500; determining a plurality of historical movement tracks corresponding to the current position and the current time; and determining the motion section of the electronic device based on the plurality of historical movement tracks.

In a possible example, in term of determining the motion rate of the electronic device 500, the instructions in the one or more programs 540 are configured to execute the following: obtaining a motion distance within a specified duration; determining the motion rate of the electronic device based on the motion distance and the specified duration.

In a possible example, before the electronic device 500 is connected to the target wireless network, the instructions in the one or more programs 540 are configured to execute the following: determining a plurality of reference wireless networks scheduled for connecting to the electronic device 500; determining a network quality value of each reference wireless network in the plurality of reference wireless networks to obtain a plurality of second network quality values; determining a reference wireless network corresponding to a maximum value in the plurality of second network quality values as the target wireless network.

In a possible example, after the electronic device 500 is connected to the target wireless network, the instructions in the one or more programs 540 are further configured to execute the following: obtaining a wireless network rate of the target wireless network; in response to the wireless network rate being less than the preset threshold, determining a network data allocation ratio of the mobile data network to the target wireless network based on a ratio between the target network rate and the wireless network rate; using the mobile data network and the target wireless network based on the network data allocation ratio.

In a possible example, in term of using the mobile data network and the target wireless network based on the network data allocation ratio when the electronic device 500 plays a multimedia file, the instructions in the one or more programs 540 are configured to execute the following: estimating a motion duration for the motion section; determining a memory size of the multimedia file based on the motion duration; determining a first pre-stored data packet corresponding to the mobile data network and a second pre-stored data packet corresponding to the target wireless network respectively based on the memory size and the network data allocation ratio; controlling the mobile data network to download the first pre-stored data packet, and controlling the target wireless network to download the second pre-stored data packet.

In a possible example, the instructions in the one or more programs 540 are further configured to execute the following: in response to the wireless network rate being greater than or equal to the preset threshold, controlling the target wireless network to download a data packet corresponding to the memory size.

The technical solutions of the embodiments of the present disclosure are mainly introduced from the perspective of execution process at the method side. It should be understood that, the electronic device includes hardware structures and/or software modules that execute various functions in order to implement the above functions. A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Embodiments of the present disclosure may divide the functional modules of the electronic device according to the above method examples, for example, various functional modules may be divided corresponding to various functions, and two or more functions may be integrated in one processing module. The integrated module as described above may be achieved in the form of hardware, or may be achieved in the form of a software functional module. It should be noted that, the division of modules in embodiments of the present disclosure is illustrative, for example, the modules are just divided according to logic functions. In practical implementation, the modules can be divided in other manners.

Figure 2:
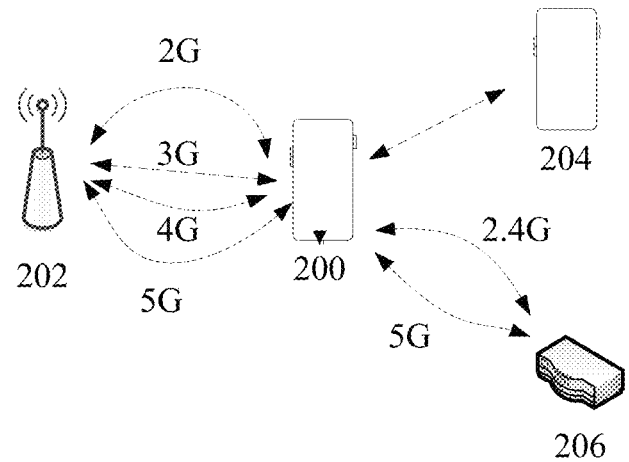
FIG. 2 is a schematic diagram illustrating a network architecture of a network connection system according to an embodiment of the present disclosure.
Figure 6:
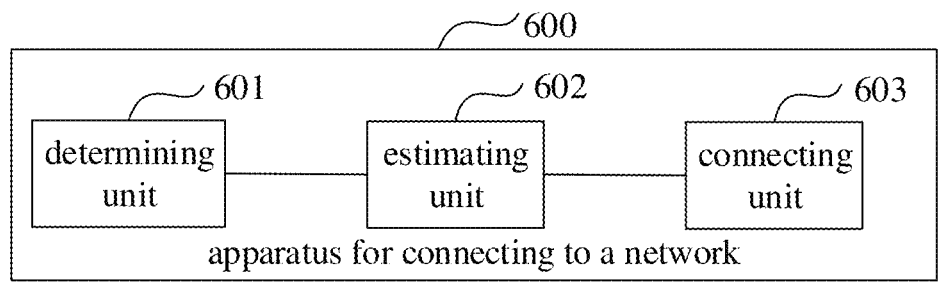
FIG. 6 is a schematic diagram illustrating an apparatus for connecting to a network according to an embodiment of the present disclosure.

FIG. 6 is a block diagram illustrating an apparatus for connecting to a network according to an embodiment of the present disclosure, which is applied to an electronic device illustrated in FIG. 2. In detail, as illustrated in FIG. 6, the apparatus 600 includes: a determining unit 601, an estimating unit 602, and a connecting unit 603.

The determining unit 601 is configured to determine a motion section and a motion rate of an electronic device in response to the electronic device accessing to a mobile data network.

The estimating unit 602 is configured to estimate a target network rate of the mobile data network based on the motion rate and the motion section.

The connecting unit 603 is configured to connect to a target wireless network in response to the target network rate being less than a preset threshold.

It may be understood that, if the electronic device has accessed to the mobile data network, the motion section and the motion rate of the electronic device are determined, and the target network rate of the mobile data network is estimated according to the motion rate and the motion section, and if the target network rate is less than the preset threshold, the target wireless network is connected. In this way, the electronic device is supported to implement the network access based on the target wireless network, such that the network quality of the electronic device in the motion section may be improved.

In a possible example, in term of estimating the target network rate of the mobile data network based on the motion rate and the motion section, the estimating unit 602 is configured to obtain a plurality of historical usage records of the mobile data network in the mobile section; estimate a reference network rate of the mobile data network based on the plurality of historical usage records; estimate a network signal influence value based on the motion rate; determine a product of the reference network rate and the network signal influence value as the target network rate of the mobile data network.

In a possible example, in term of estimating the reference network rate of the mobile data network based on the plurality of historical usage records, the estimating unit 602 is configured to obtain a performance parameter of each antenna in a plurality of antennas of the electronic device to obtain a plurality of performance parameters; estimate a network quality value of each antenna in the plurality of antennas based on the plurality of performance parameters to obtain a plurality of first network quality values; count a usage count of each antenna in the plurality of antennas based on the plurality of historical usage records to obtain a plurality of usage counts; determine a weight of each antenna in the plurality of antennas based on the plurality of usage counts to obtain a plurality of weights; estimate the reference network rate of the mobile data network based on the plurality of first network quality values and the plurality of weights.

In a possible example, in term of determining the motion section of the electronic device, the determining unit 601 is configured to determine a current position and a current time of the electronic device; determine a plurality of historical movement tracks corresponding to the current position and the current time; and determine the motion section of the electronic device based on the plurality of historical movement tracks.

In a possible example, in term of determining the motion rate of the electronic device, the determining unit 601 is configured to obtain a motion distance within a specified duration; determine the motion rate of the electronic device based on the motion distance and the specified duration.

In a possible example, before the electronic device is connected to the target wireless network, the determining unit 601 is further configured to determine a plurality of reference wireless networks scheduled for connecting to the electronic device; determine a network quality value of each reference wireless network in the plurality of reference wireless networks to obtain a plurality of second network quality values; determine a reference wireless network corresponding to a maximum value in the plurality of second network quality values as the target wireless network.

In a possible example, after the electronic device is connected to the target wireless network, the determining unit 601 is further configured to obtain a wireless network rate of the target wireless network; in response to the wireless network rate being less than the preset threshold, determine a network data allocation ratio of the mobile data network to the target wireless network based on a ratio between the target network rate and the wireless network rate. The connecting unit 603 is further configured to use the mobile data network and the target wireless network based on the network data allocation ratio.

In a possible example, in term of using the mobile data network and the target wireless network based on the network data allocation ratio when the electronic device plays a multimedia file, the connecting unit 603 is configured to estimate a motion duration for the motion section; determine a memory size of the multimedia file based on the motion duration; determine a first pre-stored data packet corresponding to the mobile data network and a second pre-stored data packet corresponding to the target wireless network respectively based on the memory size and the network data allocation ratio; control the mobile data network to download the first pre-stored data packet, and control the target wireless network to download the second pre-stored data packet.

In a possible example, the connecting unit 603 is further configured to, in response to the wireless network rate being greater than or equal to the preset threshold, control the target wireless network to download a data packet corresponding to the memory size.

A computer storage medium is further provided in embodiments of the present disclosure, in which the computer storage medium is configured to store a computer program, and the computer program is configured to cause a computer to execute some or all of steps of any one method recorded in method embodiments. The computer includes an electronic device.

A computer program product is further provided in embodiments of the present disclosure. The computer program product includes a non-transitory computer-readable storage medium storing a computer program, and the computer program is operable to cause a computer to execute some or all of steps of any one method recorded in method embodiments. The computer program product may be a software installation package, the computer includes an electronic device.

It should be noted that, for convenience and simplicity of description, the above method embodiments are described in a form of a combination of a series of steps. However, those skilled in the art can understand clearly that, the present disclosure is not limited by the order of the steps, since some steps may be performed simultaneously or in other orders according to present disclosure. In addition, those skilled in the art can understand clearly that, the described embodiments are preferred embodiments, of which relative steps or modules may be unnecessary for the present disclosure.

In above embodiments, each embodiment may be described with focusing on different aspects. Parts not described in some embodiments may refer to relative descriptions in other embodiments.

It should be understood that, the apparatus disclosed in several embodiments provided by the present disclosure can be realized in any other manner. For example, the apparatus embodiments described above can be merely exemplary, for example, the units are just divided according to logic functions. In practical implementation, the units can be divided in other manners, for example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The integrated units may be implemented in form of hardware, or in form of functional software units.

If the integrated unit is implemented in form of functional software units and are sold or used as separate products, it can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or an optical disk.

It should be understood that all or a part of the method provided by the present disclosure may be realized by programs instructing relative hardware, the programs may be stored in a computer-readable memory. The memory may include a flash disk, an ROM, an RAM, a magnet disk, an optical disk and the like.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:
1. A method for connecting to a network, comprising:
determining a motion section and a motion rate of an electronic device in response to the electronic device accessing to a mobile data network, wherein the motion section is a route along which the electronic device moves;
estimating a target network rate of the mobile data network based on the motion rate and the motion section; and
connecting to a target wireless network in response to the target network rate being less than a preset threshold;
wherein, estimating the target network rate of the mobile data network based on the motion rate and the motion section comprises:
obtaining a plurality of historical usage records of the mobile data network in the motion section;
estimating a reference network rate of the mobile data network based on the plurality of historical usage records;
estimating a network signal influence value based on the motion rate, wherein the network signal influence value reflects an influence of the motion rate on a network signal; and
determining a product of the reference network rate and the network signal influence value as the target network rate of the mobile data network.

2. The method of claim 1, wherein, estimating the reference network rate of the mobile data network based on the plurality of historical usage records comprises:
  obtaining a performance parameter of each antenna of the electronic device; obtaining a first network quality value of each antenna based on a plurality of performance parameters;
  obtaining a usage count of each antenna based on the plurality of historical usage records; determining a weight of each antenna based on a plurality of usage counts; and
  estimating the reference network rate of the mobile data network based on a plurality of first network quality values and a plurality of weights.

3. The method of claim 1, wherein, determining the motion section of the electronic device comprises:
  determining a current position and a current time of the electronic device; determining a plurality of historical movement tracks corresponding to the current position and the current time; and
  determining the motion section of the electronic device based on the plurality of historical movement tracks.

4. The method of claim 1, wherein, determining the motion rate of the electronic device comprises:
  obtaining a motion distance within a specified duration; and
  determining the motion rate of the electronic device based on the motion distance and the specified duration.

5. The method of claim 1, further comprising:
  determining a plurality of reference wireless networks scheduled for connecting to the electronic device;
  determining a second network quality value of each of the plurality of reference wireless networks; and
  determining a reference wireless network corresponding to a maximum value in a plurality of second network quality values as the target wireless network.

6. The method of claim 1, further comprising:
  obtaining a wireless network rate of the target wireless network;
  determining a network data allocation ratio of the mobile data network to the target wireless network based on a ratio between the target network rate and the wireless network rate in response to the wireless network rate being less than the preset threshold; and
  using the mobile data network and the target wireless network based on the network data allocation ratio.

7. The method of claim 6, wherein, when the electronic device plays a multimedia file, using the mobile data network and the target wireless network based on the network data allocation ratio comprises:
  estimating a motion duration for the motion section;
  determining a memory size of the multimedia file based on the motion duration;
determining a first pre-stored data packet corresponding to the mobile data network and a
  second pre-stored data packet corresponding to the target wireless network based on the memory size and the network data allocation ratio;
  controlling the mobile data network to download the first pre-stored data packet, and controlling the target wireless network to download the second pre-stored data packet.

8. The method of claim 7, further comprising:
  controlling the target wireless network to download a data packet corresponding to the memory size in response to the wireless network rate being greater than or equal to the preset threshold.

9. The method of claim 1, wherein, determining the motion rate of the electronic device comprises:
  detecting a posture and an inclination angle of the electronic device based on an internal sensor of the electronic device; and
  determining the motion rate of the electronic device based on changes in the posture and the inclination angle.

10. The method of claim 2, wherein, the performance parameter comprises a plurality of pieces of network dimension information, and estimating the network quality value of each antenna comprises:
  obtaining an evaluation value of each piece of network dimension information; and
  estimating the network quality value of the antenna by weighting the evaluation value of each piece of network dimension information based on a pre-stored weight of the piece of network dimension information.

11. The method of claim 5, wherein, determining the network quality value of each reference wireless network comprises:
  determining the network quality value of the reference wireless network based on a record of connection between the electronic device and the reference wireless network.

12. An electronic device, comprising a processor, a memory, a communication interface, and one or more programs,
  wherein, the one or more programs are stored in the memory and configured to be executed by the processor, wherein the one or more programs comprise instructions for implementing steps in a method for connecting to a network, the method comprising:
  determining a motion section and a motion rate of the electronic device in response to the electronic device accessing to a mobile data network, wherein the motion section is a route along which the electronic device moves;
  estimating a target network rate of the mobile data network based on the motion rate and the motion section; and
  connecting to a target wireless network in response to the target network rate being less than a preset threshold;
  wherein, estimating the target network rate of the mobile data network based on the motion rate and the motion section comprises:
  obtaining a plurality of historical usage records of the mobile data network in the motion section;
  estimating a reference network rate of the mobile data network based on the plurality of historical usage records;
  estimating a network signal influence value based on the motion rate, wherein the network signal influence value reflects an influence of the motion rate on a network signal; and
  determining a product of the reference network rate and the network signal influence value as the target network rate of the mobile data network.

13. The electronic device of claim 12, wherein, estimating the reference network rate of the mobile data network based on the plurality of historical usage records comprises:
  obtaining a performance parameter of each antenna of the electronic device obtaining a first network quality value of each antenna based on a plurality of performance parameters;

obtaining a usage count of each antenna based on the plurality of historical usage records; determining a weight of each antenna based on a plurality of usage counts; and estimating the reference network rate of the mobile data network based on a plurality of first network quality values and a plurality of weights.

14. The electronic device of claim 12, wherein the one or more programs further comprises instructions for performing the following:

determining a plurality of reference wireless networks scheduled for connecting to the electronic device;

determining a second network quality value of each of the plurality of reference wireless networks; and determining a reference wireless network corresponding to a maximum value in a plurality of second network quality values as the target wireless network.

15. The electronic device of claim 12, wherein the one or more programs further comprise instructions for performing the following:

obtaining a wireless network rate of the target wireless network;

determining a network data allocation ratio of the mobile data network to the target wireless network based on a ratio between the target network rate and the wireless network rate in response to the wireless network rate being less than the preset threshold; and using the mobile data network and the target wireless network based on the network data allocation ratio.

16. The electronic device of claim 15, wherein, when the electronic device plays a multimedia file, using the mobile data network and the target wireless network based on the network data allocation ratio comprises:

estimating a motion duration for the motion section;

determining a memory size of the multimedia file based on the motion duration;

determining a first pre-stored data packet corresponding to the mobile data network and a second pre-stored data packet corresponding to the target wireless network based on the memory size and the network data allocation ratio;

controlling the mobile data network to download the first pre-stored data packet, and controlling the target wireless network to download the second pre-stored data packet.

17. The electronic device of claim 16, wherein the one or more programs further comprises instructions for performing the following:

controlling the target wireless network to download a data packet corresponding to the memory size in response to the wireless network rate being greater than or equal to the preset threshold.

18. A non-transitory computer-readable storage medium storing computer programs, wherein the computer programs are configured to cause a computer to execute a method for connecting to a network, comprising:

determining a motion section and a motion rate of an electronic device in response to the electronic device accessing to a mobile data network, wherein the motion section is a route along which the electronic device moves;

estimating a target network rate of the mobile data network based on the motion rate and the motion section; and connecting to a target wireless network when the target network rate is less than a preset threshold;

wherein, estimating the target network rate of the mobile data network based on the motion rate and the motion section comprises:

obtaining a plurality of historical usage records of the mobile data network in the motion section;

estimating a reference network rate of the mobile data network based on the plurality of historical usage records;

estimating a network signal influence value based on the motion rate, wherein the network signal influence value reflects an influence of the motion rate on a network signal; and determining a product of the reference network rate and the network signal influence value as the target network rate of the mobile data network.

* * * * *